US012110212B2

(12) United States Patent
Aitamurto et al.

(10) Patent No.: US 12,110,212 B2
(45) Date of Patent: Oct. 8, 2024

(54) SAFETY ARRANGEMENT, ELEVATOR SYSTEM, AND METHOD FOR PREVENTING DERAILMENT OF AN ELEVATOR CAR AT A TURNING STATION OF AN ELEVATOR SYSTEM

(71) Applicant: KONE Corporation, Helsinki (FI)

(72) Inventors: Juha-Matti Aitamurto, Helsinki (FI); Ari Kattainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 17/475,884

(22) Filed: Sep. 15, 2021

(65) Prior Publication Data

US 2022/0106165 A1 Apr. 7, 2022

(30) Foreign Application Priority Data

Oct. 2, 2020 (EP) .................................... 20199828

(51) Int. Cl.

*B66B 5/28* (2006.01)
*B66B 1/36* (2006.01)
*B66B 5/16* (2006.01)
*B66B 9/00* (2006.01)

(52) U.S. Cl.

CPC .............. *B66B 5/284* (2013.01); *B66B 1/365* (2013.01); *B66B 5/16* (2013.01); *B66B 9/003* (2013.01)

(58) Field of Classification Search

CPC ..... B66B 5/284; B66B 1/365; B66B 11/0407; B66B 5/16; B66B 9/003

See application file for complete search history.

(56) References Cited

U.S. PATENT DOCUMENTS

| | | | | |
|---|---|---|---|---|
| 10,829,345 | B2 * | 11/2020 | Madera | B66B 9/003 |
| 2016/0288809 | A1 * | 10/2016 | Sornik | B61J 1/02 |
| 2017/0107080 | A1 * | 4/2017 | Steinhauer | B66B 1/36 |
| 2017/0369280 | A1 * | 12/2017 | Roberts | B66B 5/288 |
| 2018/0257911 | A1 | 9/2018 | Gainche et al. | |
| 2019/0077635 | A1 * | 3/2019 | King | B66B 9/003 |
| 2019/0367331 | A1 * | 12/2019 | Dietze | B66B 1/3476 |
| 2019/0375611 | A1 * | 12/2019 | Madera | B66B 19/002 |
| 2020/0062548 | A1 | 2/2020 | Gainche et al. | |

(Continued)

FOREIGN PATENT DOCUMENTS

| | | | |
|---|---|---|---|
| DE | 102015218025 | A1 | 3/2017 |
| DE | 102016222837 | A1 | 5/2018 |
| WO | WO2018/220277 | A1 | 12/2018 |

OTHER PUBLICATIONS

European Search Report and Search Opinion of application 20199828.3 dated Apr. 8, 2021.

*Primary Examiner* — Diem M Tran
*Assistant Examiner* — Michelle M Mudwilder
(74) *Attorney, Agent, or Firm* — Birch, Stewart, Kolasch & Birch, LLP

(57) ABSTRACT

A safety arrangement is suitable for a turning station of an elevator system. The safety arrangement includes at least one first blocking position for preventing, by a first mechanical device, an elevator car from entering the turning station, wherein the first mechanical device is arranged to change its position in response to operation of the turning station, and at least one second blocking position for preventing, by a second mechanical device, an elevator car from exiting the turning station.

20 Claims, 5 Drawing Sheets

(56) References Cited

U.S. PATENT DOCUMENTS

| | | | | |
|---|---|---|---|---|
| 2020/0131001 | A1* | 4/2020 | Madera | B66B 7/024 |
| 2020/0262678 | A1* | 8/2020 | Chou | B66B 1/2466 |
| 2021/0094798 | A1* | 4/2021 | Thum | B66B 5/0031 |
| 2022/0306428 | A1* | 9/2022 | Draeger | B66B 7/021 |

* cited by examiner

SAFETY ARRANGEMENT, ELEVATOR SYSTEM, AND METHOD FOR PREVENTING DERAILMENT OF AN ELEVATOR CAR AT A TURNING STATION OF AN ELEVATOR SYSTEM

FIELD OF THE INVENTION

The present invention relates in general to elevators. In particular, however not exclusively, the present invention concerns elevators utilizing linear motors for moving elevator car or cars thereof and having at least one turning station at which the movement direction of the elevator car can be changed between non-parallel directions, such as between vertical and horizontal directions.

BACKGROUND

There are known elevators in which linear motors are utilized for moving the elevator car and which comprise arrangement for moving an elevator car between two vertical shafts by a horizontal path therebetween. Typically, the arrangement comprises some devices which change their positions so as to allow changing the movement direction of the elevator car between two directions. It is important that the arrangement and the devices thereof are in their correct positions for receiving the elevator car by the arrangement and also when the car exits the arrangement so that changing of the movement direction is possible and that the elevator car does not become damaged. Thus, solutions for mitigating the risks related to changing the movement direction are needed.

SUMMARY

An objective of the present invention is to provide a safety arrangement, an elevator system, and a method for preventing derailment of an elevator car at a turning station.

The objectives of the invention are reached by a safety arrangement, an elevator system, and a method for preventing derailment of an elevator car at a turning station of an elevator system as defined by the respective independent claims.

According to a first aspect, a safety arrangement is provided. The safety arrangement is preferably suitable for use at a turning station of an elevator. The arrangement comprises at least one first blocking position for preventing an elevator car from entering the turning station by a first mechanical device, wherein the first mechanical device is configured to change its position in response to operation of the turning station. The arrangement also comprises at least one second blocking position for preventing, by a second mechanical device, an elevator car from exiting the turning station.

The term "turning station" refers herein to an arrangement, system, or device(s) which is/are arranged to change the movement direction of the elevator car between non-parallel directions. For example, the elevator car may be first moving in the vertical direction. Then, at the turning station, the movement direction is changed to a horizontal direction. It is to be noted, however, that the movement direction may be changed between any two directions, that is, not limited to vertical and horizontal directions.

Additionally, preferably, the arrangement may comprise at least one aligned position for allowing the elevator car to enter and/or exit the turning station.

In various embodiments, the first blocking position and the second blocking position may be defined relative to the elevator car approaching or exiting the turning station. Thus, the turning station may be in the first blocking position relative to an elevator car approaching from one direction while, at the same time, be in the second blocking position for another elevator car at the turning station or in the aligned position for still another elevator car.

The turning station may always, relative to any elevator car, be in at least one of the following: the first blocking position, the second blocking position, the aligned position. Thus, for an elevator car approaching the turning station, the turning station may be either in the first blocking position or in the aligned position. For an elevator car exiting the turning station, the turning station may be either in the second blocking position or in the aligned position.

In various preferably embodiments, the second mechanical device may be arranged in fixed manner with respect to an elevator shaft of the elevator system.

In addition, in the aligned position, at least one rail portion of the turning station may be properly aligned with at least one rail portion in the elevator shaft so that derailment of the elevator car is prevented. There may be a gap between said rail portions, however, the rail portions are preferably arranged so that the elevator car is able to move over the gap, if any.

The term "derailment" refers herein to a situation where, for example, rail portion or portions in the elevator shaft along which the elevator car is arranged to move are not properly aligned with rail portion or portions at the turning station into which the elevator car is entering. This would cause the elevator car to slip out of the rail portion(s) since the counter portion(s) in the turning station is/are being misaligned with respect to said rail portion(s) of the elevator shaft. On the other hand, as another example, the rail portion(s) of the turning station along which the elevator car is arranged to move are not properly aligned with the rail portion(s) of the elevator shaft into which the elevator car is exiting from the turning station. This would cause the elevator car to slip out of the rail portion(s) since the counter portion(s) in the elevator shaft is/are being misaligned with respect to said rail portion(s) at the turning station.

Furthermore, the elevator car may comprise at least one buffer device arranged to contact the first mechanical device in the at least one first blocking position.

Thus, when the elevator car is entering the turning station which is in the first blocking position, the first mechanical device prevents the elevator car from derailing by stopping the movement of the elevator car.

Alternatively or in addition, the elevator car may comprise at least one buffer device arranged to contact the second mechanical device in the at least one second blocking position. Thus, when the elevator car is exiting the turning station which is in the second blocking position, the second mechanical device prevents the elevator car from derailing by stopping the movement of the elevator car.

Further still, the at least one buffer device may advantageously be arranged to absorb at least a portion of collision energy between the buffer device and the first or the second mechanical device, thus making the impact between the elevator car and the first or the second mechanical device less severe.

According to a second aspect, an elevator system is provided. The elevator system comprises an elevator shaft, at least one or a plurality of elevator cars arranged to move, or movable, in the elevator shaft, a linear motor, such as its stator(s), arranged to extend in the elevator shaft, wherein the at least one elevator car is or the plurality of elevator cars are configured to be moved along the linear motor, at least one turning station for changing a movement direction of the elevator car or cars. The elevator system further comprises the safety arrangement in accordance with the first aspect.

In some embodiments, the elevator system may comprise a plurality of safety arrangements.

Furthermore, the safety arrangement or arrangements may be associated with one or more of a plurality of movers of a single elevator car.

According to a third aspect, a method for preventing derailment of an elevator car at a turning station of an elevator system is provided. The method comprises:

- arranging a first mechanical device to prevent the elevator car from entering the turning station when the turning station is in a first blocking position relative to the elevator car;
- configuring the first mechanical device to change its position in response to operation of the turning station; and
- arranging a second mechanical device to prevent the elevator car from exiting the turning station when the turning station is in a second blocking position relative to the elevator car.

Preferably, the method may comprise arranging the first mechanical device and the second mechanical device to allow the elevator car to enter and/or exit the turning station in an aligned position of the turning station.

Additionally, in the method, the operation of the turning station may include rotating of one or several components of the turning station.

Further still, the method may comprise arranging, in the aligned position, at least one rail portion of the turning station to properly align with at least one rail portion of the elevator shaft, that is outside to turning station, so that derailment of the elevator car is prevented.

Furthermore, the method may comprise arranging at least one buffer device to the elevator car to contact with the first mechanical device, when the elevator car is entering the turning station in the at least one first blocking position.

Alternatively or in addition, the method may comprise arranging at least one buffer device to the elevator car to contact with the second mechanical device, when the elevator car is exiting the turning station in the at least one second blocking position.

The present invention provides safety arrangement, elevator systems, and methods for preventing derailment of an elevator car at a turning station of an elevator system. The present invention provides advantages over known solution in that it at least mitigates the risk of derailment of an elevator car when it is entering or exiting a turning station. In various embodiments, an elevator car is prevented from entering to the turning station if the rail portions thereof are not aligned with rail portions along which the elevator car approaches the turning station. Furthermore, an elevator car can be prevented from exiting the turning station if the rail portions of the rail portions of the turning station are not aligned with those in the elevator shaft along which the elevator car is to be moved when exiting the turning station. Thus, the risk of derailment can at least be reduced.

Various other advantages will become clear to a skilled person based on the following detailed description.

The expression "a plurality of" may refer to any positive integer starting from two (2), that is being at least two.

The terms "first", "second", etc., herein used to distinguish one element from other element, and not to specially prioritize or order them, if not otherwise explicitly stated.

The exemplary embodiments of the present invention presented herein are not to be interpreted to pose limitations to the applicability of the appended claims.

The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
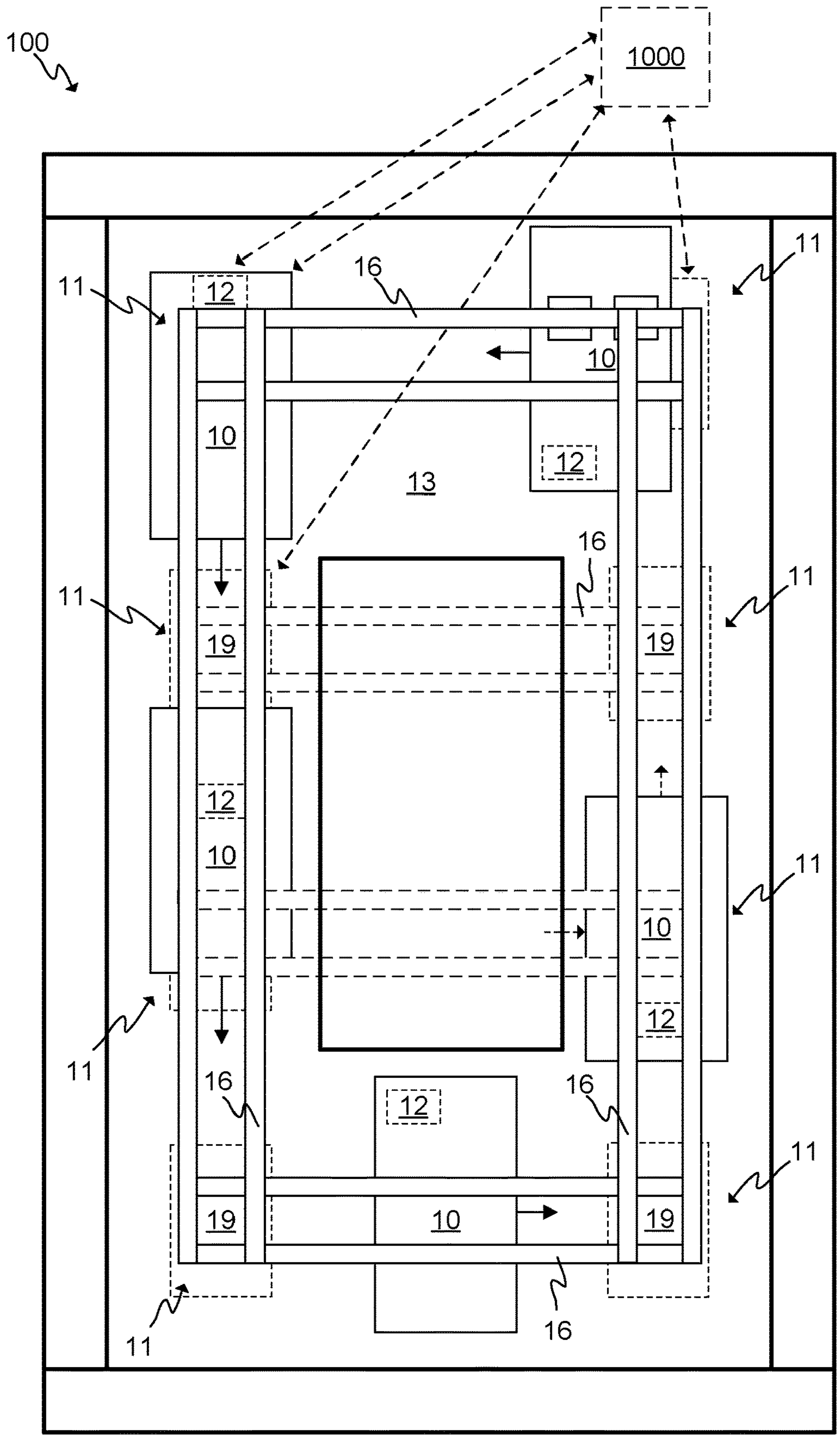
FIG. 1 illustrates schematically an elevator system according to an embodiment of the present invention.

FIG. 1 illustrates schematically an elevator system 100 according to an embodiment of the present invention. The elevator system 100 may comprise at least one or a plurality of elevator cars 10 moving in the elevator shaft 13 or the elevator car pathway. The elevator car(s) 10 may comprise an electrical converter unit 12, such as comprising a frequency converter or an inverter, and/or an energy storage, such as a battery or batteries. The electrical converter unit 12 may be utilized for operating a mover arranged to the elevator car 10 for moving the car 10 along the stator beams 16 in the elevator shaft 13.

There may also be other electrically operated equipment in the elevator car 10 such as lighting, doors, user interface, emergency rescue equipment, etc. The electrical converter unit 12 or a further electrical converter unit, such as an inverter or a rectifier, may be utilized for operating one or several of said other equipment of the elevator car 10. The energy storage may, preferably, be electrically coupled to the electrical converter unit 12, for example, to the intermediate circuit of the frequency converter, for providing electrical power to the electrical converter unit 12 and/or for storing electrical energy provided by the electrical converter unit or a further electrical converter unit or other electrical power source.

There are preferably at least two landing floors, having landing floor doors 19 or openings 19, comprised in the elevator system 100. Thus, there may also be at least two landings which the elevator car(s) 10 serve. There may also be doors comprised in the elevator car 10. Although shown in FIG. 1 that there are two horizontally separated sets, or "columns", of vertically aligned landing floors, there could as well be only one column as in conventional elevators or more than two, for example, three.

Regarding the elevator shaft 13, it may be such as defining substantially closed volume in which the elevator car 10 is adapted and configured to be moved. The walls may be, for example, of concrete, metal or at least partly of glass, or any combination thereof. The elevator shaft 13 herein refers basically to any structure or pathway along which the elevator car 10 is configured to be moved.

As can be seen in FIG. 1 with respect to the elevator system 100, which is a multi-car elevator system, the elevator cars 10 may be moved along the elevator shaft 13 vertically and/or horizontally depending on the direction of stator beams 16. According to embodiments similar to one in FIG. 1 in this respect, the elevator cars 10 may be configured to be moved along a number of vertical and/or horizontal stator beams 16, for example, two beams such as in FIG. 1. Some of the stator beams 16 are illustrated with dashed lines indicating their optionality.

However, it should be realized that there may also be stator beams 16 in the middle part of the shaft 13, such as shown in FIG. 1 with dashed lines. Still further, one, several or all stator beams may be inclined, that is not being vertical nor horizontal.

The stator beams 16 are part of an electric linear motor of the elevator system 100 utilized to move the elevator car 10 or cars 10 in the elevator shaft 13. The stator beams 16 may, preferably, be arranged in fixed manner, that is, stationary with respect to the elevator shaft 13, for example, to a wall of the shaft by fastening portions, which may be arranged to be rotatable at turning stations 11, such as comprising a turning device, for example, a turngear or a turntable or the like.

The elevator system 100 may comprise an elevator control unit 1000 for controlling the operation of the elevator system 100. The elevator control unit 1000 may be a separate device or may be comprised in the other components of the elevator system 100 such as in or as a part of the electrical converter unit 12. The elevator control unit 1000 may also be implemented in a distributed manner so that, e.g., one portion of the elevator control unit 1000 may be comprised in the electrical converter unit 12 and another portion in the elevator car 10. The elevator control unit 1000 may also be arranged in distributed manner at more than two locations or in more than two devices.

The elevator control unit 1000 may comprise one or more processors, one or more memories being volatile or non-volatile, or non-transitory, for storing portions of computer program code and any data values and possibly one or more user interface units. The mentioned elements may be communicatively coupled to each other with e.g. an internal bus.

The processor may be arranged to access the memory and retrieve and store any information therefrom and thereto. For sake of clarity, the processor herein refers to any unit suitable for processing information and control the operation of the elevator control unit 1000, among other tasks. The operations may also be implemented with a microcontroller solution with embedded software. Similarly, the memory is not limited to a certain type of memory only, but any memory type suitable for storing the described pieces of information may be applied in the context of the present invention.

Furthermore, the elevator system 100 may, preferably, comprise safety device(s), such as at the end(s) of the shaft 13 and/or at door zone(s). These safety devices may be, for example, buffers or other known safety devices in the elevator shaft 13.

Figure 2A:
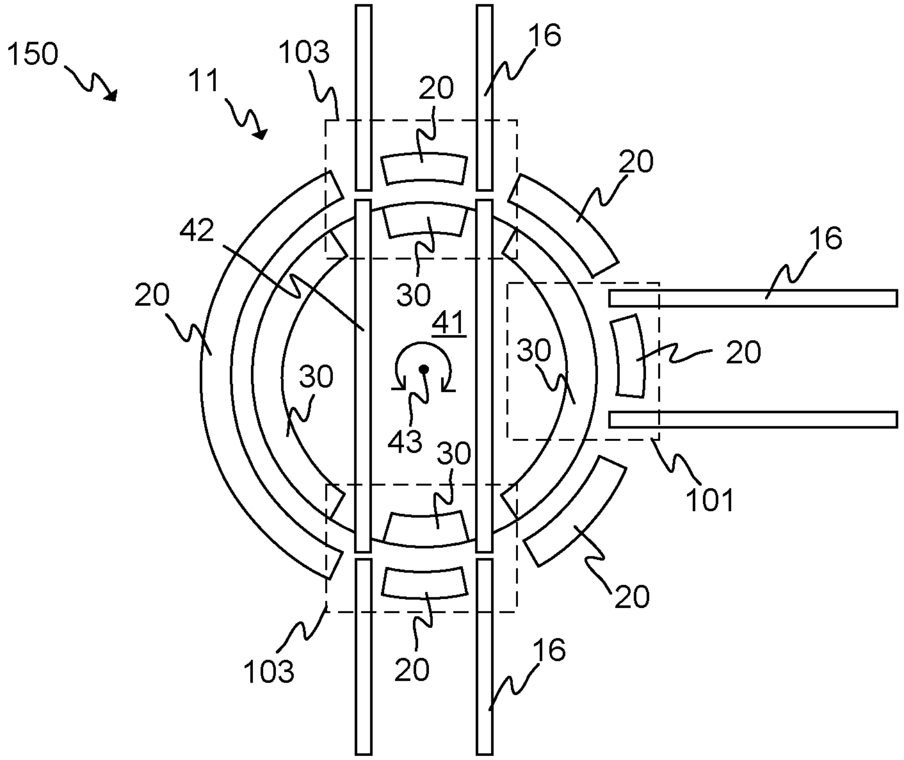
FIGS. 2A and 2B illustrate schematically a safety arrangement according to an embodiment of the present invention.
Figure 2B:
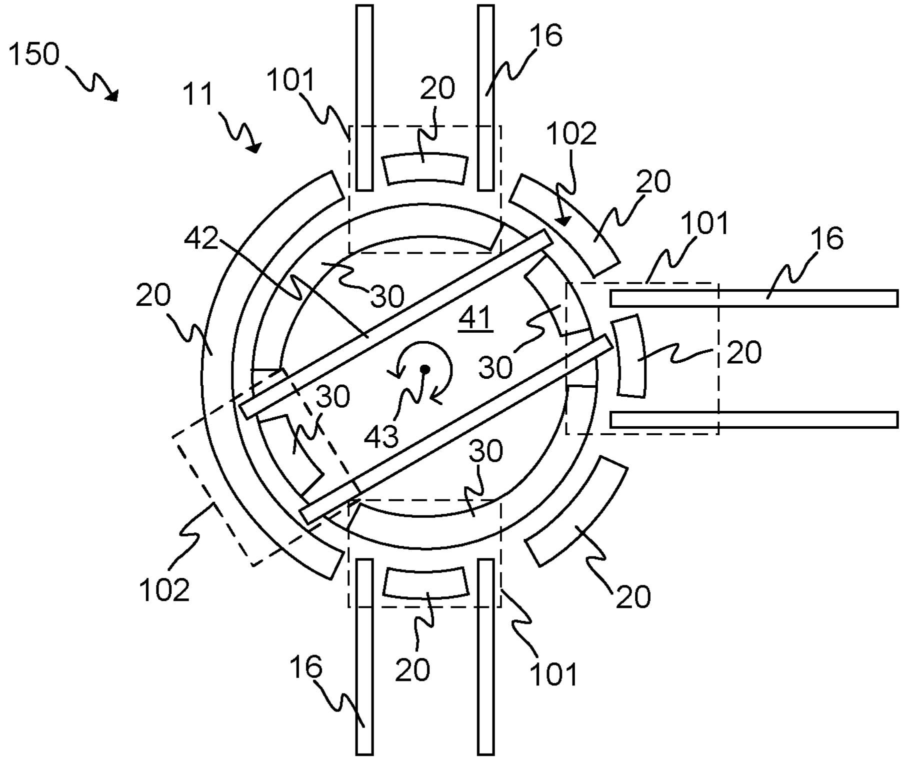

FIGS. 2A and 2B illustrate schematically a safety arrangement 150 according to an embodiment of the present invention. In FIGS. 2A and 2B, as well as in various other embodiments, the safety arrangement 150 is suitable for use in connection with a turning station 11 of an elevator system 100.

The turning station 11 may comprise a turning device 41. In various embodiments, the turning device 41 may comprise a rotatable platform and in connection thereto, rail portions 42 of the turning station 11 being similar or corresponding with respect to the stator beams 16 of the electric linear motor of the elevator system 100. The turning device 41 may resemble a turntable having an axis of rotation 43, for instance. As can be seen in FIGS. 2A and 2B, there are two parallel stator beams 16 extending from below and above to the turning station 11. Another set of two parallel stator beams 16 extend to the right of the turning station 11.

The primary function of the turning station 11 is to enable movement of the elevator car 10 between said two sets of the stator beams 16, especially between the vertical sets and the horizontal set. Thus, the turning device 41 must be in the correct position with respect to the stator beams 16 from which or to which the elevator car 10 is moving in order to avoid derailment of the elevator car 10. The correct position depends, of course, from which the elevator car 10 is approaching the turning station 11 or to which direction is the elevator car 10 is about to move away from the turning station 11. As becomes clear, the turning device 41 is thus configured to turn or at least allow turning of the rail portions 42 of the turning device 41.

The safety arrangement 150 may comprise at least one first blocking position 101, wherein an elevator car 10 is prevented from entering the turning station 11 by one or several first mechanical devices 30. This is visible in both FIGS. 2A and 2B. The first mechanical device 30 may be configured to change its position in response to operation of the turning station 11, such as rotate with the turning device 41. The safety arrangement 150 may further comprise at least one second blocking position 102 (only shown in FIG. 2B), wherein an elevator car 10 is prevented from exiting the turning station 11 by one or several second mechanical devices 20.

In various embodiments, the first mechanical device 30 may be a part of or being mounted on the turning device 41, and thereby changing its position in response to change of position of the turning device 41.

In various embodiments, the second mechanical device 20 may be part of or being mounted in fixed manner with respect to the elevator shaft 13. Thus, the second mechanical device 20 may maintain its position when the turning station 11 is being operated.

As can be seen in FIG. 2A, the safety arrangement 150 preferably comprises at least one aligned position 103 for allowing an elevator car 10 to enter and/or exit the turning station 11. In the aligned position 103, at least one rail portion 42 of the turning station 11 may, preferably, be properly aligned with at least one rail portion 16 of an elevator shaft 13, that is a rail portion outside the turning station 11, so that derailment of the elevator car 10 can be prevented.

Figure 3:
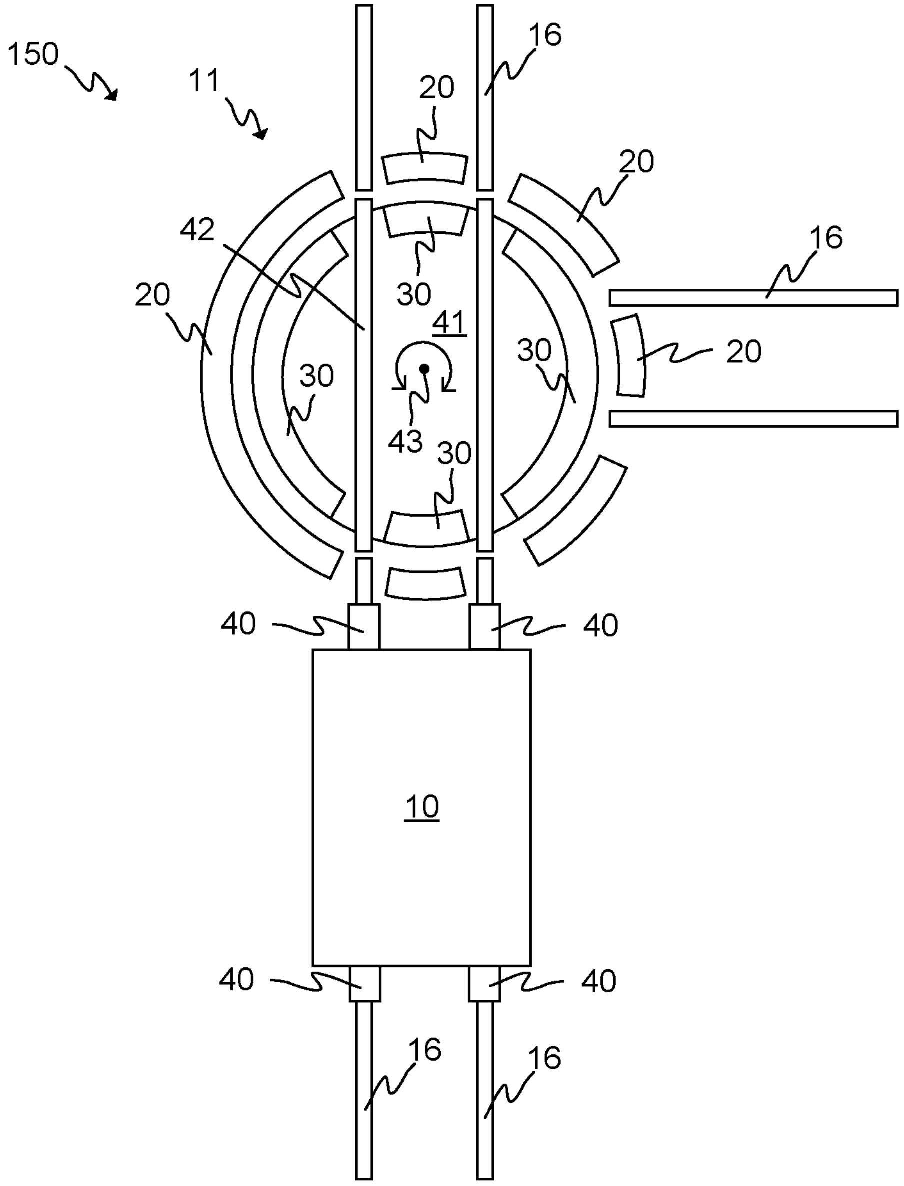
FIG. 3 illustrates schematically a safety arrangement according to an embodiment of the present invention.

FIG. 3 illustrates schematically a safety arrangement 150 according to an embodiment of the present invention. The turning station 11 and the related components, such as the mechanical devices 20, 30 may be essentially similar to ones illustrated in and described in connection to FIGS. 2A and 2B.

Figure 5:
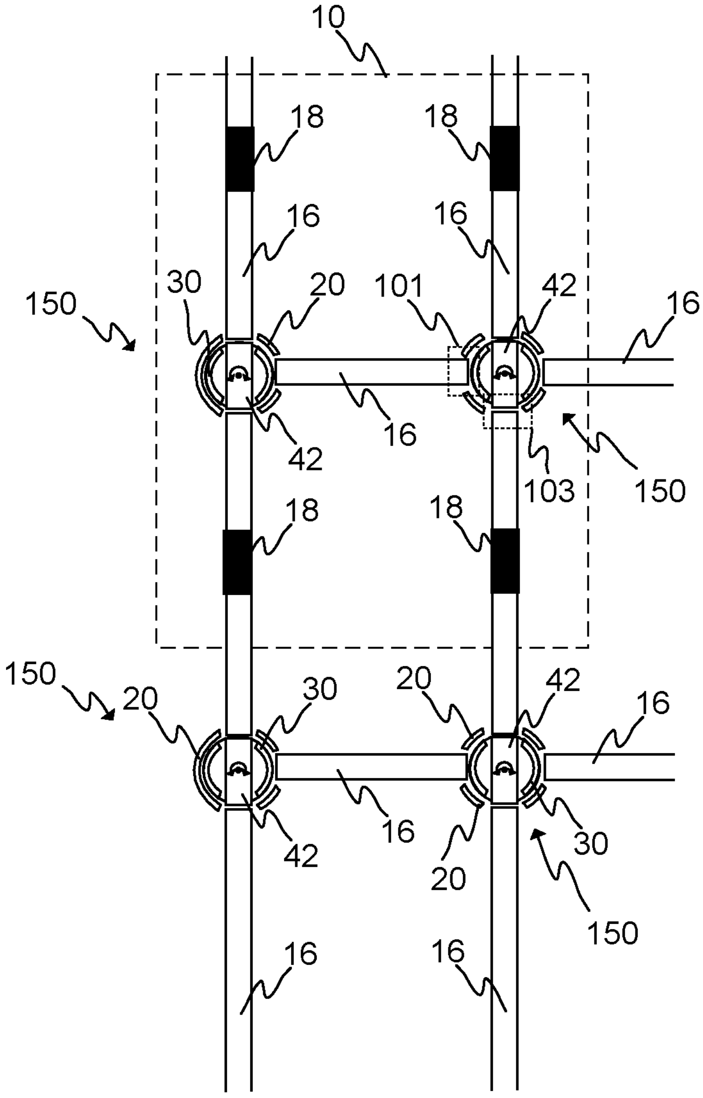
FIG. 5 illustrates schematically a safety arrangement according to an embodiment of the present invention.

Furthermore, as shown in FIG. 3, the safety arrangement 150 may comprise, as mounted in the elevator car 10, or to a mover or movers thereof (for example, as shown in FIG. 5), at least one buffer device 40 arranged to contact the first mechanical device 30 in the at least one first blocking position 101 of the arrangement 150.

Alternatively or in addition, the safety arrangement 150 may comprise, in the elevator car 10, at least one buffer device 40 arranged to contact the second mechanical device 20 in the at least one second blocking position 102. Thus, the buffer(s) 40 may be the same for the first 30 and the second 20 mechanical devices, or there may buffer(s) 40 for just one of them, or different buffers 40 for both of them. As may be understood, the elevator car 10 exiting the turning station 11 may typically have lower speeds than the ones approaching and entering the turning station 11. Thus, the buffers 40 may also be dimensioned differently.

In some embodiments, the at least one buffer device may be arranged to absorb at least a portion of collision energy between the buffer device and the first 30 or the second mechanical device 20. Thus, the mechanical device 20, 30 may not be damaged severely due to the impact.

Figure 4:
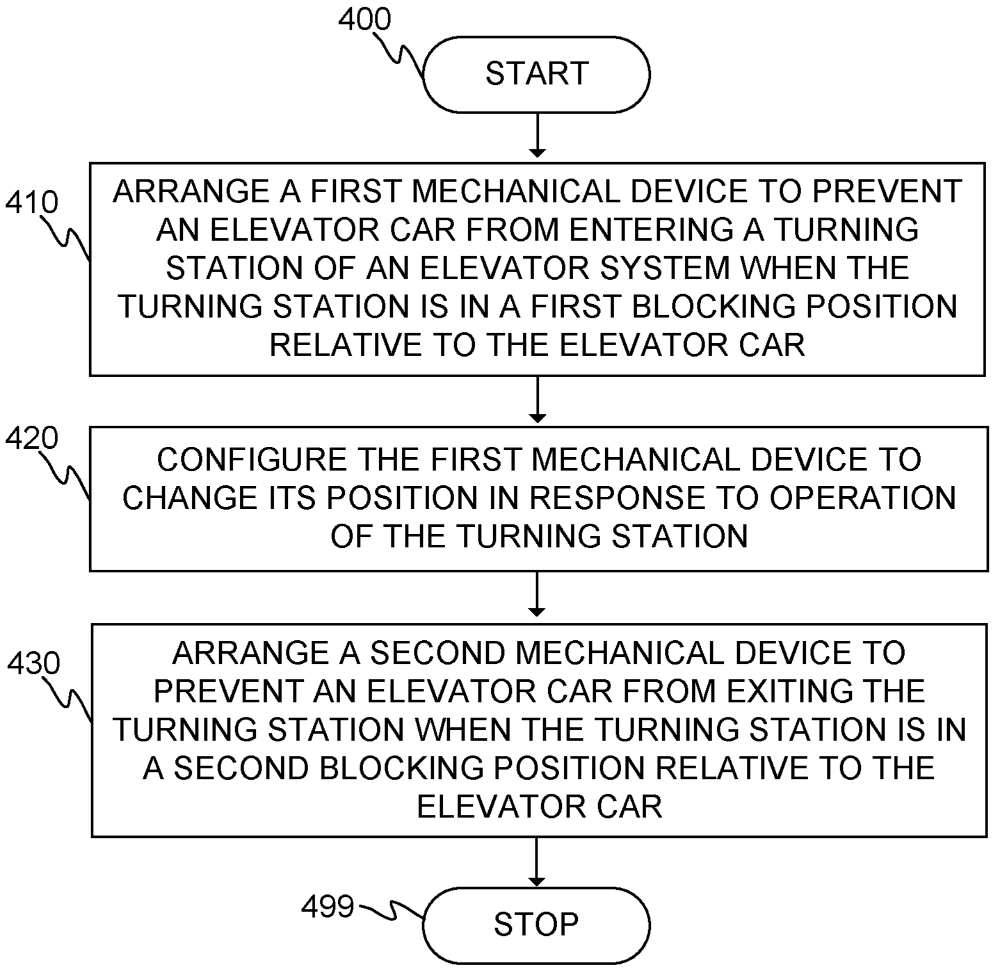
FIG. 4 shows a flow diagram of a method according to an embodiment of the present invention.

FIG. 4 shows a flow diagram of a method according to an embodiment of the present invention.

Step 400 refers to a start-up phase of the method. Suitable equipment and components are obtained and systems assembled and configured for operation.

Item 410 may refer to arranging a first mechanical device 30 to prevent an elevator car 10 from entering the turning station 11 when the turning station is in a first blocking position 101 relative to the elevator car 10.

Item 420 may refer to configuring the first mechanical device 30 to change its position in response to operation of the turning station 11, such as in response to rotation of the turning device 41 thereof.

Item 430 may refer to arranging a second mechanical device 20 to prevent an elevator car from exiting the turning station 11 when the turning station 11 is in a second blocking position 102 relative to said elevator car 10.

Method execution may be stopped at 499.

The method may, preferably, comprise arranging the first mechanical device 30 and the second mechanical device 20 to allow an elevator car 10 to enter and/or exit the turning station 11 in an aligned position 103 of the turning station 11.

In various embodiments, the method may comprise arranging, in the aligned position 103, at least one rail portion 42 of the turning station 11 to properly align with at least one rail portion 16 of an elevator shaft 13 so that derailment of the elevator car 10 may be prevented.

In some embodiments, the method may comprise arranging at least one buffer device 40 to the elevator car 10 to contact with the first mechanical device 30, when the elevator car 10 is entering the turning station 11 in the at least one first blocking position 101.

Alternatively or in addition, the method may comprise arranging at least one buffer device 40 to the elevator car 10 to contact with the second mechanical device 20, when the elevator car 10 is exiting the turning station 11 in the at least one second blocking position 102.

FIG. 5 illustrates schematically a safety arrangement 150 according to an embodiment of the present invention. As can be seen in FIG. 5, there may be plurality of safety arrangements 150 arranged associated with two, more, or even each one of the movers 18 mounted on the elevator car 10. In FIG. 5, the elevator car 10 is shown comprising four movers 18 arranged to be utilized for moving the elevator car 10 along the stator beams 16, that is two parallel beams 16. Thus, one safety arrangement 150 may be arranged with respect to each of the movers 18. Otherwise the operation of the safety arrangements 150 may be as described hereinabove. Therefore, the elevator system 100 may comprise a plurality of safety arrangements 150. Furthermore, the safety arrangement 150 or arrangements 150 may be associated with one or more of a plurality of movers 18 of a single elevator car 10, or with one or more of a plurality of movers 18 of many or each of the elevator cars 10. The safety arrangements 150 may be controlled, such as turned, simultaneously, for example, as a set, or individually.

The invention claimed is:

1. A safety arrangement for a turning station of an elevator system, comprising:

- a rotatable turning device;
- a first mechanical device having at least one arcuate section extending about a perimeter of the rotatable turning device and having at least one opening at the perimeter of the rotatable turning device, a length along the perimeter of the least one arcuate section being greater than a length along the perimeter of the at least one opening, the first mechanical device being rotatable about an axis;
- a second mechanical device having at least one opening,
- at least one blocking position for preventing an elevator car from entering the turning station by the at least one opening of the first mechanical device not aligning with the at least one opening of the second mechanical device; and
- at least one aligned position having the at least one opening of the first mechanical device aligned with the at least one opening of the second mechanical device to allow the elevator car to enter and exit the turning station.

2. The safety arrangement of claim 1, wherein the second mechanical device is arranged in fixed manner with respect to an elevator shaft of the elevator system.

3. The safety arrangement of claim 1, wherein the operation of the turning station includes rotation of one or several components of the turning station, including the rotatable turning device of the turning station.

4. The safety arrangement of claim 1, wherein, in the aligned position, at least one rail portion of the turning station is properly aligned with at least one rail portion of an elevator shaft so that derailment of the elevator car is prevented.

5. The safety arrangement of claim 1, wherein the elevator car comprises at least one buffer device arranged to contact the first mechanical device in the at least one blocking position.

6. The safety arrangement of claim 5, wherein the at least one buffer device is arranged to absorb at least a portion of collision energy between the buffer device and the first or the second mechanical device.

7. The safety arrangement of claim 1, wherein the elevator car comprises at least one buffer device arranged to contact the second mechanical device in the at least one blocking position.

8. An elevator system comprising:

- an elevator shaft;
- at least one or a plurality of elevator cars arranged to move in the elevator shaft;
- a linear motor arranged to extend in the elevator shaft, wherein the at least one elevator car is or the plurality of elevator cars are configured to be moved along the linear motor;

at least one turning station for changing a movement direction of the elevator car or cars;

at least one of the safety arrangements of claim 1.

9. The elevator system of claim 8, comprising a plurality of the safety arrangements.

10. The elevator system of claim 8, wherein the safety arrangement is associated with one of a plurality of movers of the elevator car.

11. The safety arrangement of claim 1, wherein the at least one opening of the first mechanical device comprises a first pair of diametrically opposed openings, and wherein the at least one opening of the second mechanical device comprises a second pair of diametrically opposed openings and a third opening between the second pair of diametrically opposed openings.

12. The safety arrangement of claim 11, wherein first rails are aligned with the second pair of diametrically opposed openings and second rails are aligned with the third opening.

13. The safety arrangement of claim 1, wherein in the blocking position, the second mechanical device overlaps the at least one opening of the first mechanical device and the first mechanical device overlaps the at least one opening of the second mechanical device to prevent movement of the elevator car into and out of the turning station.

14. The safety arrangement of claim 1, wherein the first mechanical device prevents movement of the elevator car into the turning station in the blocking position, and wherein the second mechanical device prevents movement of the elevator car out of the turning station in the blocking position.

15. The safety arrangement of claim 1, wherein the first mechanical device and the second mechanical device are concentric.

16. A method for preventing derailment of an elevator car at a turning station of an elevator system, comprising:

providing a rotatable turning device;

arranging at least one opening in a first mechanical device having at least one arcuate section, the at least one opening being at the perimeter of the rotatable turning device, a length along the perimeter of the least one arcuate section being greater than a length along the perimeter of the at least one opening, the first mechanical device extending about a perimeter of the rotatable turning device relative to at least one opening in a second mechanical device so that the at least one opening in the second mechanical device is completely misaligned with the at least one opening in the first mechanical device in a radial direction to prevent an elevator car from entering the turning station when the turning station is in a blocking position relative to the elevator car;

configuring the first mechanical device to change its position relative to the second mechanical device in response to operation of the turning station; and arranging the at least one opening in the first mechanical device to be aligned with the at least one opening in the second mechanical device to allow the elevator car to enter and exit the turning station in an aligned position.

17. The method of claim 16, wherein the operation of the turning station includes rotating of one or several components of the turning station.

18. The method of claim 16, comprising arranging, in the aligned position, at least one rail portion of the turning station to properly align with at least one rail portion of an elevator shaft so that derailment of the elevator car is prevented.

19. The method of claim 16, arranging at least one buffer device to the elevator car to contact with the first mechanical device when the elevator car is entering the turning station in the blocking position.

20. The method of claim 16, arranging at least one buffer device to the elevator car to contact with the second mechanical device when the elevator car is exiting the turning station in the blocking position.

* * * * *